Figure 1:
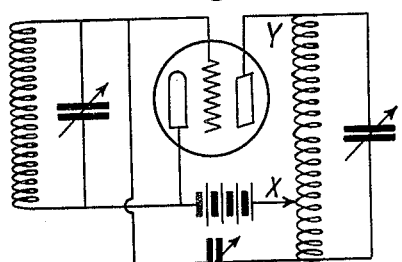

Dec. 26, 1933.  G. M. WRIGHT ET AL  1,940,986
THERMIONIC GENERATOR AND AMPLIFIER OF HIGH FREQUENCY OSCILLATIONS
Filed June 5, 1926

Inventor
GEORGE MAURICE WRIGHT
AND SIDNEY BERTRAM SMITH
By their Attorney- Ira J. Adams Patented Dec. 26, 1933

1,940,986

UNITED STATES PATENT OFFICE 1,940,986

THERMIONIC GENERATOR AND AMPLIFIER OF HIGH FREQUENCY OSCILLATIONS

George Maurice Wright, Chesterfield, and Sidney Bertram Smith, Chelmsford, England, assignors to Radio Corporation of America, a corporation of Delaware Application June 5, 1926, Serial No. 113,859, and in Great Britain June 29, 1925

9 Claims. (Cl. 179—171)

This invention relates to thermionic generators and amplifiers of high frequency oscillations, and has for its object the nullifying of the reaction which normally takes place between the grid and plate circuits of thermionic tubes employed in generators and amplifiers of high frequency oscillations, due to the natural self-capacity of the tube.

In general, devices employed hitherto for this purpose depend for their action upon the Wheatstone bridge principle, and in such devices the Wheatstone bridge or its equivalent is so arranged that the grid and output circuits respectively are arranged each at the opposite ends of a diagonal of the bridge, the object being to prevent a change of voltage in the one case from resulting in a change of voltage in the other. The bridge is usually provided with additional capacities to balance the natural self capacity of the tube.

Theoretically, if such a bridge be balanced, no reaction will take place, but in practice it has been found that none of these arrangements behaves as stably as the simple bridge theory would indicate. It is believed that the instability is due to the existence of secondary or tertiary oscillations which are not balanced out by the bridge arrangement. Such oscillations in general take place around the bridge rather than across it.

According to the present invention, we employ an arrangement of the Wheatstone bridge type, in a manner similar to that previously referred to, and we provide damping resistances in the bridge, such that while not upsetting the balance thereof, they damp out secondary or tertiary oscillations.

The invention is applicable to various arrangements employing the Wheatstone bridge principle. It may, for example, be applied to the so-called "push-pull" type of amplifier, provided with means for preventing reaction. One known form of such amplifier comprises a tuned circuit connected at each end to the grid of a thermionic tube, the anodes of the two tubes employed being connected through a second tuned circuit. The mid point of the inductance forming part of the first tuned circuit forms the grid-negative connection, and the mid point of the inductance forming part of the second tuned circuit forms the high tension positive connection.

Anti-reaction balancing condensers are connected each between the plate of one thermionic tube and the grid of the other.

We have found that despite the balancing effect of the condensers, there exist secondary oscillations in a circuit passing from one tuned circuit, through one tube, the second tuned circuit, the second tube and back to the first tuned circuit, and that the balancing condensers do not prevent oscillations taking place in this circuit. The arrangement is, in fact, in this respect not unlike the usual two tube oscillator used for the generation of very short waves.

Tertiary oscillations may also take place in a circuit passing from the mid point of the first inductance through the two halves of this inductance in parallel (and opposition) through the capacity of the two tubes in parallel and the halves of the second inductance to its mid point, thence via the high tension supply and grid negative.

In applying our invention to this amplifier, the damping resistances are included each in series with and preferably next to the grids of the two tubes, and damping resistances are also connected in series with the balancing condensers, the resistances being so proportioned as not to upset the balance of the bridge.

We have found that resistances so inserted are effective in damping out both the secondary and tertiary modes of oscillation.

In the case in which identical tubes are employed, that is to say, tubes whose natural capacity is equal, all of the resistances may be equal.

It has been found that such a circuit is stable.

Figure 2:
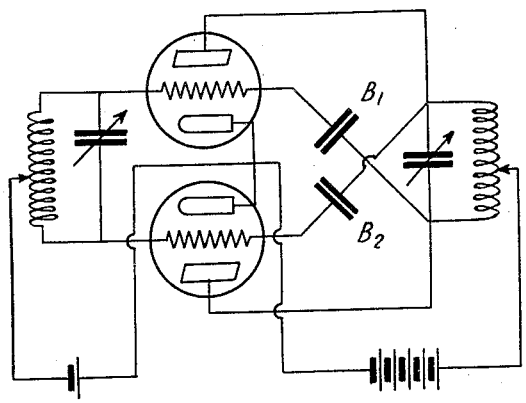
Figure 3:
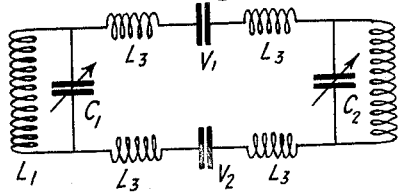
Figure 4:
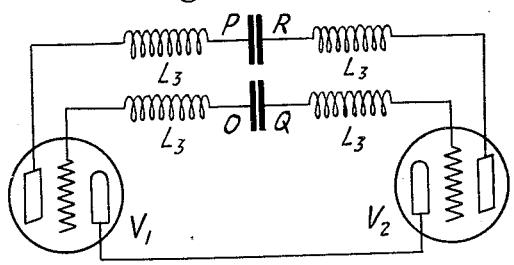
Figure 5:
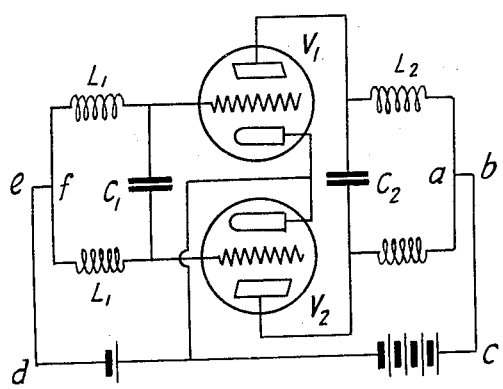
Figure 6:
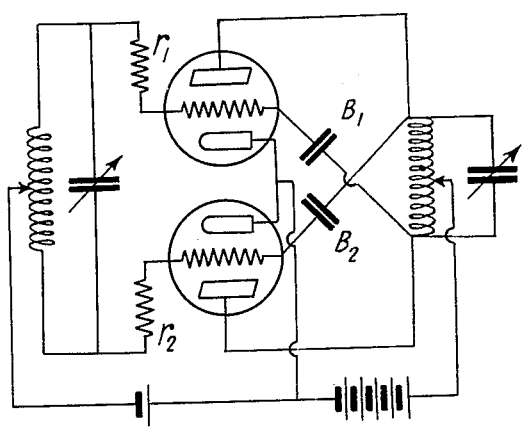
Figure 7:
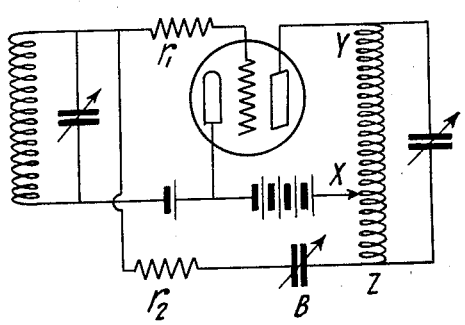

The invention is described with reference to the accompanying drawing, in which Figures 1 and 2 show diagrammatically two forms of known anti-reaction circuit arrangements; Figures 3, 4 and 5 are diagrammatic representations of the arrangement shown in Figure 2, drawn out in different form to show the different modes of oscillation existing therein; Figure 6 shows diagrammatically one way of applying the present invention to the anti-reaction arrangement shown in Figure 2; Fig. 7 shows diagrammatically one way of applying the present invention to the anti-reaction arrangement shown in Figure 1.

Referring to Figure 1, this shows one known type of bridge circuit; in this case the anode circuit inductance is tapped at the point X, the said point being connected through the high tension battery, and the tube filament to the low potential end of the grid circuit. B is the anti-reaction balancing condenser. The portions XY and XZ form the ratio arms of the bridge and a value can be found for the condenser B in relation to the grid anode tube capacity such that the bridge is balanced and the desired condition obtained. Circuits similar to Figure 1 can be obtained by arrangements of split condensers, resistances, or other impedances, instead of the tapped point upon the anode inductance shown in Figure 1, but in all these cases the same condition of balance can be obtained. Again, if desired, the ratio arms of the bridge may be formed in the grid or anode tuned circuits.

A symmetrical known anti-reaction circuit results from the application of the principle of the "push-pull" connection of a pair of tubes, as shown in Figure 2. In this case there are two anti-reaction condensers B1 and B2, which are connected from the grid of each tube to the anode of its companion tube.

It has been found in practice that none of these arrangements behaves as stably as the simple Wheatstone bridge theory would indicate. We have found that the cause of instability is due to the existence of second and third modes of oscillation, which are not balanced out by the bridge connection.

The simplest circuit to consider is the symmetrical "push-pull" arrangement of Figure 2. If the tubes be represented simply as condensers, and the anti-reaction condensers B1 and B2 be omitted, the circuit becomes that shown in Figure 3.

In this figure L1 C1 and L2 C2 are the grid and anode tuned circuits, V1 and V2 are the two tubes, while L3 represents the inductances of the connecting leads. It will be apparent from the figure that a second degree of freedom exists, the mode of oscillation being around the closed circuit formed by C1 L3 V1 L3 C2 L3 V2 L3. This circuit may be again redrawn, as shown in Figure 4.

It will be seen that this circuit is the same as that usually employed for a two tube oscillator for the generation of very short waves. The anti-reaction condensers are connected between OR QP, and it is obvious from inspection of the figure that the said anti-reaction condensers cannot balance out the reaction through the tubes for this mode of oscillation. If C1=C2 and V1=V2 and the inductances represented by L3 are all equal, then from the symmetry of the figure, the points O and R and the points P and Q will be at the same potential when oscillations occur. Consequently connecting these pairs of points by condensers or any other type of impedance will have no effect whatever upon the oscillations.

This second mode of oscillation is one cause of the instability of anti-reaction circuits of the foregoing type, and such circuits have a strong tendency to break into oscillation generally at short wave length.

The "push-pull" circuit of Figures 2, 3 and 4 can be also redrawn as shown in Figure 5.

In Figure 5 the anti-reaction condensers B1 and B2 of Figure 2 have been omitted. It can be seen that a third mode of oscillation exists round the circuit formed by the two tubes acting in parallel and the loop $a\ b\ c\ d\ e\ f$. In this case, it will be seen that the anti-reaction condensers B1 and B2 (Figure 2) will not nullify this tendency to oscillate; in some cases it will even tend to exaggerate this mode of oscillation. This oscillation is usually of short wave length.

We have found that the circuit can be made stable by damping the oscillatory paths taken in these two modes of oscillation. One method of damping these oscillations is by inserting a series resistance between the high potential end of the grid inductance and the grid of the tube. The complete "push-pull" circuit then becomes that shown in Figure 6.

Referring to this figure, $r1$ and $r2$ are resistances of such value that these modes of oscillation are suppressed; such a circuit is stable. Where the tubes employed are identical, the resistances $r1$ and $r2$ may be identical; if the circuit is unsymmetrical or the tubes differ in capacity, the resistances $r1$ and $r2$ should be adjusted to suit the special conditions.

In the case of a single tube circuit, such as that shown in Figure 1, the damping resistances may be inserted as shown in Figure 7, $r1$ and $r2$ being the said damping resistances. In this case the resistances must be so proportioned that the ratio of the tube capacity Vc to that of the balancing condenser B, is given by the relation $r1\ Vc=r2B$.

Other anti-reaction circuits may be similarly damped.

In certain cases, such as audio frequency amplifiers where balancing condensers are not essential for nullifying the first mode of oscillation, the second and third modes of oscillation may be eliminated by inserting suitable resistances between the tube grid and the input impedance.

In certain cases it may be an advantage to connect the damping resistance in the high potential end of the tube anode circuit; for example, if the loss in amplification, due to the voltage drop across a resistance connected to the grid, is too large for satisfactory operation, a better efficiency may be obtained by using equivalent resistances in the anode circuit.

Having described our invention, what we claim is:

1. A thermionic amplifier comprising input and output circuits, a pair of vacuum tubes oppositely connected in said circuits, and so arranged that one vacuum tube repeats certain parts of said incoming wave, the other vacuum tube repeating the remaining part of said incoming wave, a capacity between the input and output circuit for each of said vacuum tubes and adapted to neutralize the grid-plate capacity thereof to prevent generation of oscillations at signal frequency, and means for damping oscillations at other frequencies in said circuits comprising a resistance in the input lead of each of said vacuum tubes.

2. In thermionic repeating circuits including a plurality of thermionic tubes in push pull arrangement having input and output circuits associated therewith which inherently include primary, secondary, and tertiary oscillation circuits, each free to oscillate at its respective predetermined frequency, the combination of means for preventing oscillations in the primary oscillation circuit, means for damping oscillations in the secondary oscillation circuit, and means independent of the second means for damping oscillations in the tertiary oscillation circuit.

3. In thermionic repeating circuits including a plurality of thermionic tubes in push pull arrangement having input and output circuits associated therewith adapted to oscillate at a primary frequency, the combination of capacity means for preventing oscillation in said input and output circuit at said primary frequency, said circuits including said capacity means inherently including secondary, and tertiary oscillation circuits each free to oscillate at its respective predetermined frequency; and a resistance contained in each of said secondary and tertiary oscillation circuits for damping oscillations therein.

4. In thermionic repeating circuits comprising a pair of thermionic tubes in push pull arrangement having input and output circuits associated therewith which inherently provide primary, secondary, and tertiary oscillation circuits each free to oscillate at a primary, secondary and tertiary frequency respectively, the combination of capacitive means in shunt with a portion of said primary oscillation circuit for preventing oscillations at primary frequency therein, a resistance in series with said secondary oscillation circuit for damping oscillations therein, at said secondary frequency, and a resistance in series with said tertiary oscillation circuit for damping oscillations therein at said tertiary frequency.

5. In thermionic repeating circuits including a plurality of thermionic tubes in push pull arrangement having input and output elements and input and output circuits associated therewith adapted to oscillate at a primary frequency, the combination of capacity means associated with each tube for preventing oscillation in said input and said output circuit at said primary frequency, said circuits including said capacity means inherently including secondary and tertiary oscillation circuits each free to oscillate at its respective predetermined frequency, and resistances in said secondary and tertiary oscillation circuits for damping oscillations therein, said resistances being in series with said capacities.

6. An amplifying stage comprising input and output circuits, two electron discharge tubes oppositely connected in said circuits whereby one of the tubes is adapted to repeat certain parts, and the other, the remaining parts of incoming waves, and a coupling between the input and output circuits for each of said tubes and effective to counteract the effect of retroactive currents through the control electrode-anode impedance of its respective tube, and an independent resistance in series with each of said impedances to prevent the generation of oscillations in the stage at frequencies above the frequencies of the currents impressed on said input circuit.

7. In apparatus of the character described, an electron discharge device having an anode a cathode and a control electrode, a parallel tuned circuit connected between said cathode and control electrode, a resistance connected between said control electrode and parallel tuned input circuit, a parallel tuned circuit connected between said anode and cathode, and a variable condenser and a resistance in series connected between said control electrode and a point on said output circuit of opposite alternating potential relative to the potential of said anode, whereby said device acts as an amplifier substantially free from spurious oscillation generation over a band of frequencies.

8. In apparatus of the character described, a pair of electron discharge devices each having an anode a cathode and a control electrode, means for connecting the cathodes together, a reactance connected between said control grids, a reactance connected between said anodes, means for reactively connecting the anode of one of said devices to the control grid of another, means for reactively connecting the anode of said other device to the control grid of one device, and, a resistance in series with each of said control grids whereby said devices act as a pushpull amplifier substantially free of undesired spurious oscillation generation at a desired operating frequency and at other frequencies.

9. In apparatus of the character described, a pair of electron discharge devices, each having an anode a cathode and a control grid, a parallel tuned circuit connected between said control grids, a parallel tuned circuit connected between said anodes, a resistance connected between each of said grids and said parallel tuned circuit connected to said grids, a condenser connected between the anode of one of said devices and the control grid of another of said devices, and another condenser connected between the control grid of said other device and the anode of said one device whereby said resistances and condensers act to prevent spurious oscillation generation.

GEORGE MAURICE WRIGHT.
SIDNEY BERTRAM SMITH.